(12) United States Patent
Okada et al.

(10) Patent No.: US 11,242,901 B2
(45) Date of Patent: Feb. 8, 2022

(54) DISK BRAKE DEVICE

(71) Applicant: ADVICS CO., LTD., Kariya (JP)

(72) Inventors: Naoki Okada, Toyota (JP); Yohei Komizo, Takahama (JP); Takao Iida, Toyota (JP)

(73) Assignee: ADVICS CO., LTD., Kariya (JP)

( * ) Notice: Subject to any disclaimer, the term of this patent is extended or adjusted under 35 U.S.C. 154(b) by 42 days.

(21) Appl. No.: 16/644,573

(22) PCT Filed: Sep. 21, 2018

(86) PCT No.: PCT/JP2018/035009
§ 371 (c)(1),
(2) Date: Mar. 5, 2020

(87) PCT Pub. No.: WO2019/059340
PCT Pub. Date: Mar. 28, 2019

(65) Prior Publication Data
US 2021/0062879 A1  Mar. 4, 2021

(30) Foreign Application Priority Data

Sep. 22, 2017  (JP) .............................. JP2017-182840

(51) Int. Cl.
*F16D 65/40*   (2006.01)
*F16D 65/097*  (2006.01)
(Continued)

(52) U.S. Cl.
CPC ....... *F16D 65/0978* (2013.01); *F16D 55/226* (2013.01); *F16D 65/0056* (2013.01); *F16D 2121/04* (2013.01); *F16D 2200/0004* (2013.01)

(58) Field of Classification Search
CPC ............. F16D 65/0978; F16D 65/0977; F16D 65/0974; F16D 65/0972
(Continued)

(56) References Cited

U.S. PATENT DOCUMENTS 9,777,783 B2 * 10/2017 Asahi ..................... F16D 65/097
2006/0260884 A1 * 11/2006 Hayashi .............. F16D 65/0972
188/71.1
(Continued)

FOREIGN PATENT DOCUMENTS

FR    2925634 A1 *  6/2009  ......... F16D 65/0972
JP    2000110862 A     4/2000
(Continued)

OTHER PUBLICATIONS

Machine translation of FR 2925634 (no date).*
(Continued)

*Primary Examiner* — Nicholas J Lane
(74) *Attorney, Agent, or Firm* — Buchanan Ingersoll & Rooney PC (57) ABSTRACT

A pad support spring includes a U-shaped portion comprising an outer peripheral surface portion, an inner peripheral surface portion and a linking surface portion. The U-shaped portion is configured to include: a pad holding portion; a cutout portion provided by cutting out a part from the linking surface portion toward the inner peripheral surface portion; a tongue piece portion which in an unassembled state has a base end formed by the cutout portion on the outer peripheral surface portion side of the pad holding portion and a distal end which projects out from an opposing surface of the inner peripheral surface portion, and which in an assembled state deforms elastically to press a brake pad in conjunction with the U-shaped portion; and a first slit portion provided by cutting out part of a first linking part.

8 Claims, 9 Drawing Sheets

(51) Int. Cl.
*F16D 55/226* (2006.01)
*F16D 65/00* (2006.01)
*F16D 121/04* (2012.01)

(58) Field of Classification Search
USPC ...................................................... 188/73.38
See application file for complete search history.

(56) References Cited

U.S. PATENT DOCUMENTS

| | | | |
|---|---|---|---|
| 2009/0211857 A1 | 8/2009 | Camilo-Martinez et al. | |
| 2014/0318905 A1* | 10/2014 | Merrien | F16D 55/228 |
| | | | 188/73.38 |
| 2014/0326548 A1* | 11/2014 | Merrien | F16D 65/0977 |
| | | | 188/73.38 |
| 2015/0021127 A1* | 1/2015 | Miura | F16D 65/0977 |
| | | | 188/73.38 |
| 2018/0051760 A1* | 2/2018 | Foucoin | F16D 65/0974 |
| 2018/0163800 A1* | 6/2018 | Barbosa | F16D 55/2265 |
| 2019/0203788 A1* | 7/2019 | Sekiguchi | F16D 65/0975 |
| 2021/0156438 A1* | 5/2021 | Toguri | F16D 65/0977 |

FOREIGN PATENT DOCUMENTS

| | | |
|---|---|---|
| JP | 2008298198 A | 12/2008 |
| JP | 2011512501 A | 4/2011 |
| JP | 2014-070652 A | 4/2014 |
| JP | 2014214796 A | 11/2014 |

OTHER PUBLICATIONS

International Search Report (PCT/ISA/210) dated Nov. 13, 2018, by the Japanese Patent Office as the International Searching Authority for International Application No. PCT/JP2018/035009.
Written Opinion (PCT/ISA/237) dated Nov. 13, 2018, by the Japanese Patent Office as the International Searching Authority for International Application No. PCT/JP2018/035009.

* cited by examiner

DISK BRAKE DEVICE

TECHNICAL FIELD

The present invention relates to a disk brake device for braking a vehicle.

BACKGROUND ART

Conventionally, for example, a disk brake device (hereinafter, referred to as a "first conventional device") disclosed in Patent Literature 1 below is known. The first conventional device includes a pad spring that is assembled to a pad guide provided on a mounting member and elastically supports a friction pad with respect to the mounting member. The pad spring of the first conventional device includes a guide plate portion that guides the friction pad in the axial direction of a disk, a radial biasing portion that is formed so as to extend in the axial direction between the guide plate portion and the friction pad and that elastically biases the friction pad outward in the radial direction of the disk, and a claw portion provided between a lower surface plate of the guide plate portion and a guide bottom plate. When the claw portion is assembled to the pad guide, its distal end is hooked to a lower wall surface of the pad guide in an elastically deformed state, and a reaction force of this elastic deformation causes an upper surface plate of the guide plate portion to be pressed against an upper wall surface of the pad guide. Thus, in the pad spring of the first conventional device, the guide plate portion is prevented from falling off and held in the pad guide in a state in which the upper surface plate of the guide plate portion is abutted against the upper wall surface of the pad guide, and the lower surface plate of the guide plate portion is separated from the lower wall surface of the pad guide with a small gap.

Furthermore, conventionally, for example, a disk brake device (hereinafter, referred to as "second conventional device") disclosed in Patent Literature 2 below is also known. The second conventional device includes a pad that suppresses rotation of a disk rotor, a pad support assembled to a guide groove provided in a mount to support a convex portion of the pad, and a spring provided between the convex portion of the pad and the pad support. The spring of the second conventional device is provided with a protrusion at a portion that comes into contact with the pad support, and generates a biasing force for biasing the pad by coming into contact with the pad support through the protrusion.

CITATIONS LIST

Patent Literature

Patent Literature 1: Japanese Unexamined Patent Publication No. 2008-298198
Patent Literature 2: Japanese Unexamined Patent Publication No. 2000-110862

SUMMARY OF INVENTION

Technical Problems

In the first conventional device, the claw portion (tongue piece portion) is formed so as to project out from the lower surface plate of the guide plate portion toward the lower wall surface (inward side inner peripheral surface) of the pad guide (concave portion). Thus, the length of the formed claw portion (tongue piece portion) is shortened, so that it becomes difficult to adjust the elastic force generated by the elastic deformation of the claw portion, and it is susceptible to variations in length and it becomes difficult to generate a constant elastic force.

Thus, when the pad spring (pad support spring) is assembled to the pad guide (concave portion), the lower surface plate (inner peripheral surface portion) is spaced apart from the lower wall surface (inward side inner peripheral surface) of the pad guide (concave portion) more than necessary, and a so-called floating may occur, and distortion may occur in the pad spring (pad support spring). When the elastic force in warping the upper surface plate (outer peripheral surface portion) of the guide plate portion (U-shaped portion) toward the lower surface plate (inner peripheral surface portion) is large, the floating of the lower surface plate (inner peripheral surface portion) is promoted in a state in which the pad spring (pad support spring) is assembled to the pad guide (concave portion), and distortion may occur in the pad spring (pad support spring). When distortion occurs in the pad spring (pad support spring), there is a possibility that the support of the friction pad (brake pad) by the pad spring (pad support spring) may become unstable.

Furthermore, when distortion occurs in the pad spring (pad support spring) in the assembled state, there is a possibility that the sliding resistance when the spring comes into sliding contact with the pad spring (pad support spring) as in the second conventional device described above may increase.

The present invention has been contrived to solve the above problems. That is, an object of the present invention is to provide a disk brake device capable of suppressing distortion of an elastic member supporting a brake pad and appropriately assembling it to a concave portion of the supporting body.

Solutions to Problems

In order to solve the problems described above, a disk brake device of the present invention includes a disk rotor rotatable integrally with a wheel; a supporting body assembled to a vehicle body; a pair of brake pads that includes a back plate supported by the supporting body so as to be movable along an axial direction of the disk rotor and a lining fixed to the back plate, and that sandwiches the disk rotor; a pushing member that is assembled to the supporting body and that pushes the back plate toward the disk rotor; a convex portion that is formed on a circumferential end of the back plate in a circumferential direction of the disk rotor and that projects out from the circumferential end; a concave portion that is formed on the supporting body and that accommodates the convex portion so as to be movable in the axial direction of the disk rotor, a radial direction and the circumferential direction of the disk rotor; and an elastic member that is interposed between the convex portion and the concave portion in an assembled state of being assembled to the concave portion and that holds the back plate while biasing, where the elastic member is configured to include, in the assembled state, a U-shaped portion having an outer peripheral surface portion that abuts against an outward side inner peripheral surface of the concave portion to be the outward side in the radial direction, an inner peripheral surface portion that is configured to abut against an inward side inner peripheral surface of the concave portion to be the inward side in the radial direction, and a linking surface portion that links the outer peripheral surface portion and the inner peripheral surface portion and that abuts against a connecting surface connecting the outward side inner peripheral surface and the inward side inner peripheral surface, a spring portion that extends from the inner peripheral surface portion so as to incline along the axial direction between the outer peripheral surface portion and the inner peripheral surface portion and that separates the back plate away from the disk rotor, a cutout portion provided by cutting out a part of the linking surface portion and the inner peripheral surface portion in continuation from the linking surface portion toward the inner peripheral surface portion, in an unassembled state of not being assembled to the concave portion, a tongue piece portion that is formed in the cutout portion, that has a base end provided on the side closer to the outer peripheral surface portion than the spring portion in the radial direction and which distal end projects out toward the inward side inner peripheral surface from an opposing surface opposing the inward side inner peripheral surface of the inner peripheral surface portion, and that elastically deforms in the radial direction to press the brake pad outward together with the U-shaped portion in the assembled state, and a first slit portion provided by cutting out a part of a first linking part linking the outer peripheral surface portion and the linking surface portion.

Advantageous Effects of Invention

According to this, the tongue piece portion forming the elastic member can be extended from the linking surface portion toward the inner peripheral surface portion of the U-shaped portion, and hence the length of the tongue piece portion can be easily adjusted, and the elastic force generated by the elastic deformation of the tongue piece portion in the assembled state in which the elastic member is assembled in the concave portion can be easily adjusted. Furthermore, since the first slit portion can be provided at the first linking part between the outer peripheral surface portion and the linking surface portion, in the assembled state, the outer peripheral surface portion can be elastically deformed toward the inner peripheral surface portion and the elastic force in warping can be reduced.

Thus, in the assembled state in which the elastic member is assembled to the concave portion of the supporting body, occurrence of floating in which the inner peripheral surface portion is separated more than necessary from the inward side inner peripheral surface of the concave portion can be suppressed and promotion of the floating of the inner peripheral surface portion can also be suppressed, and distortion of the elastic member can be suppressed. Therefore, the elastic member can stably support the brake pad. Furthermore, since occurrence of distortion of the U-shaped portion, in particular, distortion of the linking surface portion can be suppressed, increase in the sliding resistance can be suppressed and as a result, smooth movement of the brake pad can be maintained even in a case in which a member that comes into sliding contact with the linking surface portion with the movement of the brake pad is provided.

DESCRIPTION OF EMBODIMENTS

Hereinafter, an embodiment of the present invention will be described with reference to the drawings. In the following embodiment and a modified example, the same or equivalent portions are denoted with the same reference numerals in the drawings. Each figure used for the description is a conceptual view, and the shape of each portion is not necessarily exact in some cases.

Figure 1:
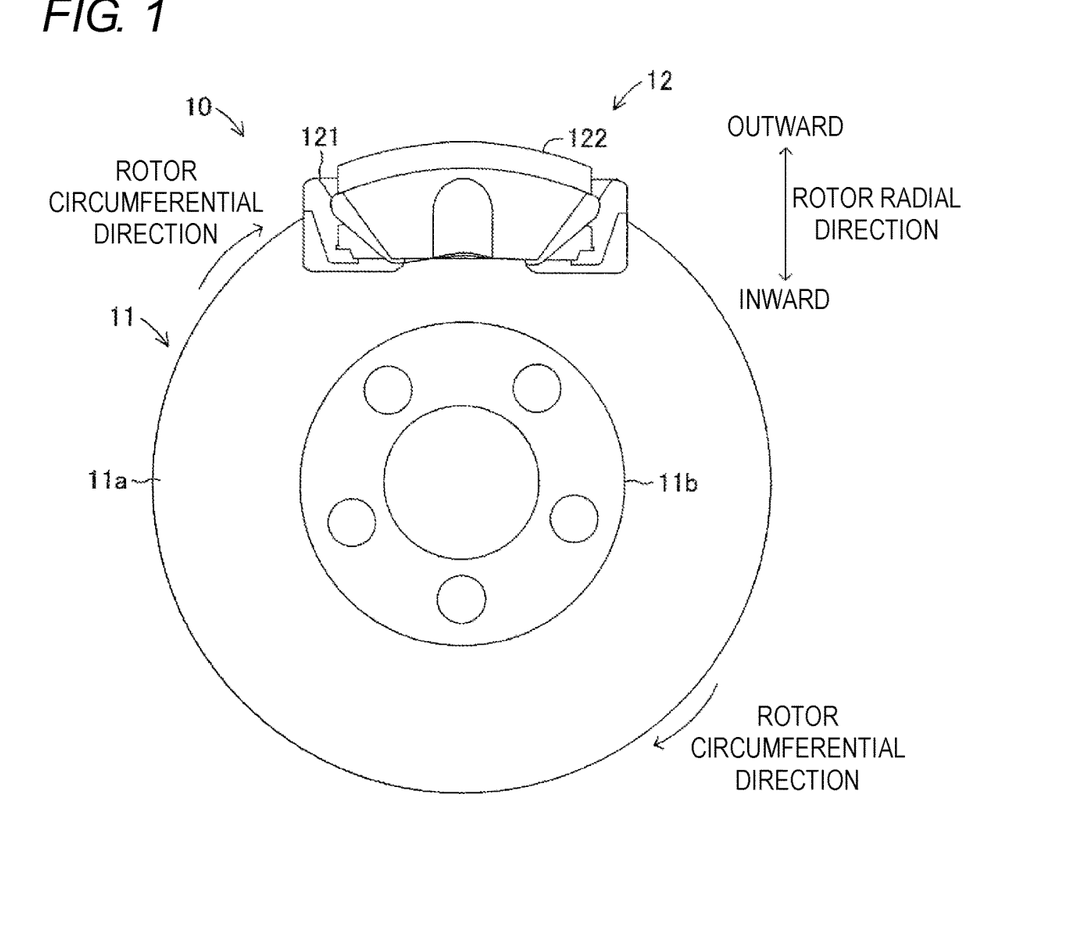
FIG. 1 is a schematic overall view of a disk brake device according to the present invention.

As shown in FIG. 1, a disk brake device 10 includes a disk rotor 11 and a caliper 12 that forms a supporting body. The disk rotor 11 is rotatably provided integrally with the wheel of a vehicle, and is configured by a disk shaped rotor main body 11a, and a cylindrical hat portion 11b fastened to a rotating portion (e.g., axle (not shown)) of the vehicle (not shown) by bolts, nuts, and the like.

Figure 2:
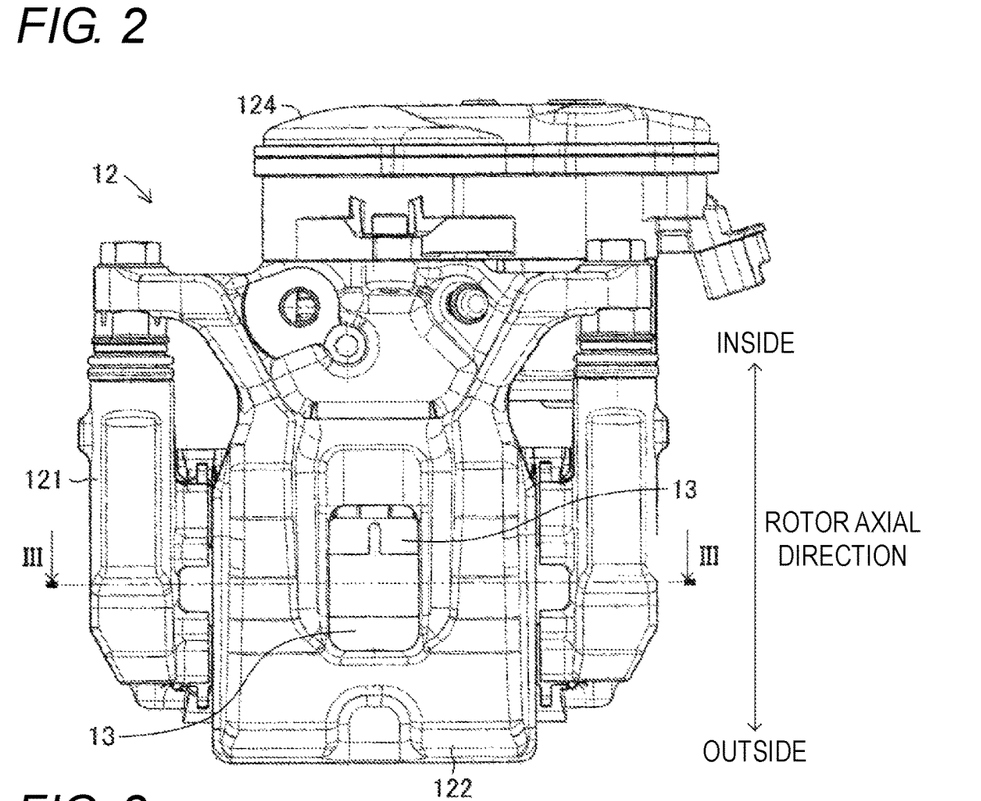
FIG. 2 is a front view schematically showing a configuration of a caliper in FIG. 1.

As shown in FIGS. 1 and 2, the caliper 12 is a floating caliper, and is provided to cross the rotor main body 11a of the disk rotor 11 while accommodating a pair of brake pads 13, to be described later. The caliper 12 includes a mount 121 serving as a supporting body fixed to a non-rotating portion (e.g., vehicle body side (not shown)) of the vehicle, and a movable caliper 122. The mount 121 supports the movable caliper 122 and the brake pad 13 so as to be displaceable along the axial direction (hereinafter, this axial direction is also referred to as "rotor axial direction") of the disk rotor 11, and so as not to be relatively displaceable along the circumferential direction (hereinafter, this circumferential direction is also referred to as "rotor circumferential direction") of the disk rotor 11.

Figure 3:
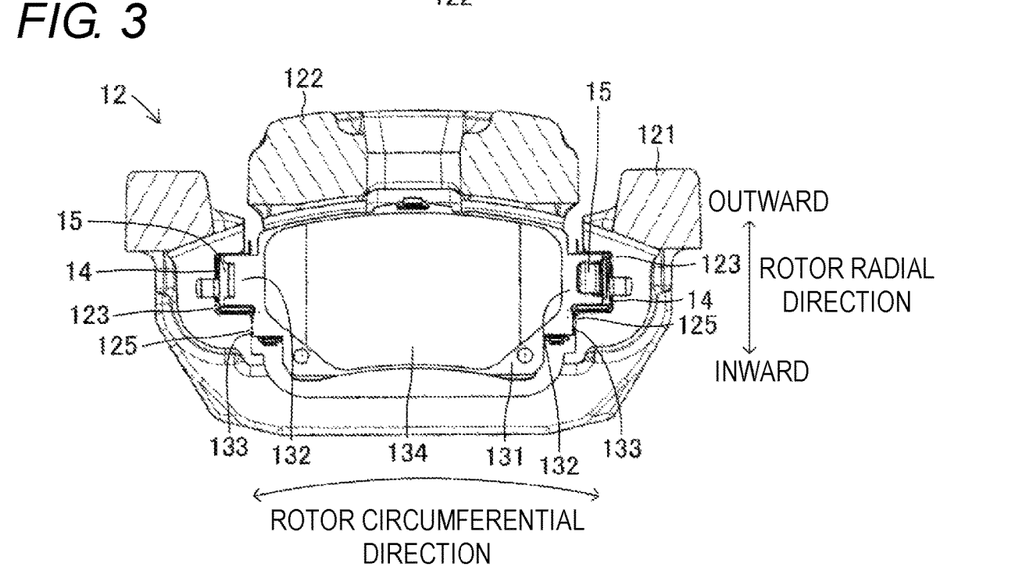
FIG. 3 is a cross-sectional view showing a section taken along line III-III of FIG. 2.

As shown in FIG. 3, the mount 121 has a concave portion 123 formed for accommodating a convex portion 132 provided on a back plate 131 of the brake pad 13 in the rotor circumferential direction. The concave portion 123 has the same structure on the inflow side and the outflow side of the disk rotor 11 in the rotor circumferential direction.

Figure 4:
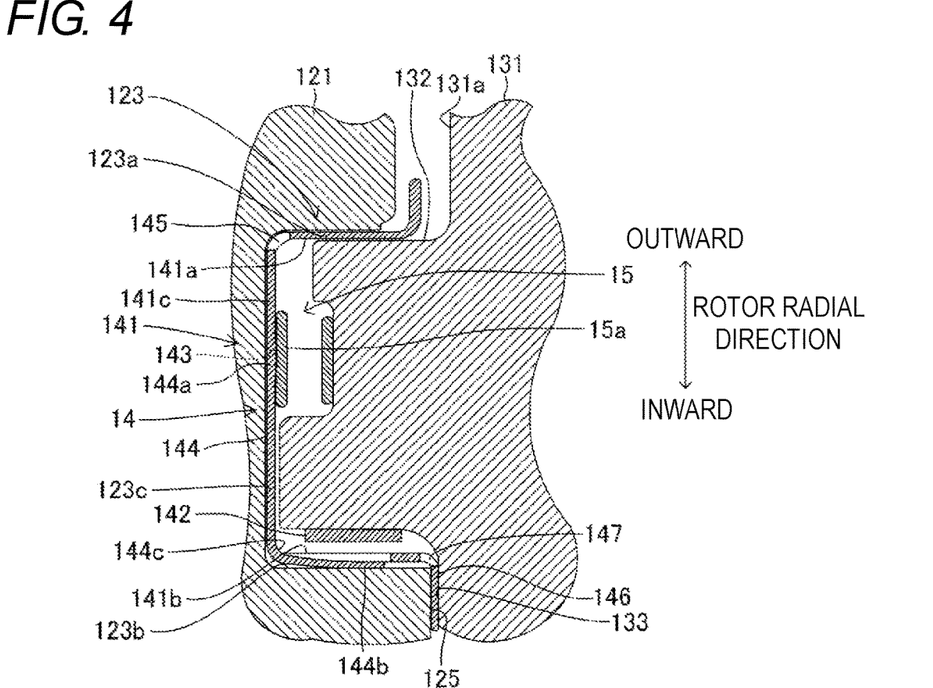
FIG. 4 is an enlarged cross-sectional view showing an assembled state of a pad support spring and a pressing spring of FIG. 3.

The concave portion 123 is formed along the rotor axial direction, and has a rectangular cross section. As shown in FIG. 4, the concave portion 123 is formed by an outward side inner peripheral surface 123a that is an outward side in a radial direction of the disk rotor 11 (hereinafter, this radial direction is also referred to as a "rotor radial direction"), an inward side inner peripheral surface 123b that is an inward side in the radial direction, and a connecting surface 123c that connects the outward side inner peripheral surface 123a and the inward side inner peripheral surface 123b.

Furthermore, in the mount 121, a torque receiving surface 125 is formed so as to be adjacent to the concave portion 123 on the inward side of the radial direction. The torque receiving surface 125 mainly receives a braking force (braking torque) transmitted through the brake pad 13 that moves along the circumferential direction at the time of braking of the vehicle, and transmits the braking force to the vehicle body side. Here, at the time of braking of the vehicle, the brake pad 13 also moves radially inward. Therefore, the inward side inner peripheral surface 123b of the concave portion 123 receives a braking force (braking torque) transmitted through the brake pad 13 that moves in the radial direction at the time of braking of the vehicle, and transmits the braking force to the vehicle body side. The caliper 12 thus receives the braking force (braking torque) with the two surfaces, the inward side inner peripheral surface 123b of the concave portion 123 and the torque receiving surface 125.

The movable caliper 122 is composed of a cylinder, a piston, and an actuator for operating the piston, and includes a pushing member 124 that pushes a pair of brake pads 13 (more specifically, back plate 131 described later) toward the disk rotor 11 (rotor main body 11a). The pushing member 124 is provided inside the vehicle with respect to the rotor main body 11a, and is operated by hydraulic pressure or electric power. The pushing member 124 causes the piston to advance in the rotor axial direction, thus pushing a brake pad 13 (hereinafter, also referred to as an "inner pad 13") on the inside in the rotor axial direction of the pair of brake pads 13 toward the rotor main body 11a and bringing the inner pad 13 into sliding contact (contact) with the rotor main body 11a.

Then, in the movable caliper 122, the cylinder is relatively displaced in a direction opposite to the piston due to a reaction caused by the piston pressing the inner pad 13. Due to the displacement of the cylinder, a brake pad 13 (hereinafter, also referred to as "outer pad 13") on the outside in the rotor axial direction of the pair of brake pads 13 is pushed toward the rotor main body 11a, and the outer pad 13 is brought into sliding contact (contact) with the rotor main body 11a. That is, the pushing member 124 pushes the pair of brake pads 13 toward the disk rotor 11 (rotor main body 11a). Here, FIG. 3 shows a state in which the outer pad 13 is accommodated in the mount 121.

As shown in FIGS. 3 and 4, the pair of brake pads 13 include a plate-like back plate 131. The back plate 131 includes a convex portion 132 projecting out from a circumferential end 131a in the rotor circumferential direction. The convex portion 132 is accommodated and supported in the concave portion 123 formed in the mount 121 together with a pad support spring 14 serving as an elastic member and a pressing spring 15 serving as a pressing member mounted on the convex portion 132 so as to be movable in the rotor axial direction, the rotor radial direction, and the rotor circumferential direction.

Furthermore, the back plate 131 includes a torque transmitting surface 133 formed so as to be adjacent to the convex portion 132 on the inward side in the rotor radial direction. The torque transmitting surface 133 transmits a braking force (braking torque) generated at the time of braking to a torque receiving surface 125.

As shown in FIG. 3, the brake pad 13 has a lining 134. The lining 134 is formed of a friction material, and is fixed to the back plate 131 so as not to be relatively displaceable. When the brake pad 13 (more specifically, the back plate 131) is pushed toward the rotor main body 11a by the pushing member 124, the lining 134 comes into sliding contact (contact) with the rotor main body 11a.

Here, in the present embodiment, "at the time of braking" means that braking is performed with a braking force of greater than or equal to a predetermined braking force (braking torque) when the brake pad 13 is pressed in the rotor axial direction by the pushing member 124 and the lining 134 comes into sliding contact with the rotor main body 11a. Furthermore, in the present embodiment, "at the time of gentle braking" means that, for example, braking is performed with a braking force of less than a predetermined braking force (braking torque) even if the lining 134 is in sliding contact with the rotor main body 11a immediately before the stopping of the vehicle.

As shown in FIGS. 3 and 4, the pad support spring 14 serving as an elastic member is assembled to the concave portion 123 formed in the mount 121 of the caliper 12. The pad support spring 14 is interposed between the convex portion 132 provided on the back plate 131 of the brake pad 13 and the concave portion 123 in an assembled state assembled to the concave portion 123 to hold the back plate 131 (brake pad 13) while biasing.

Figure 5:
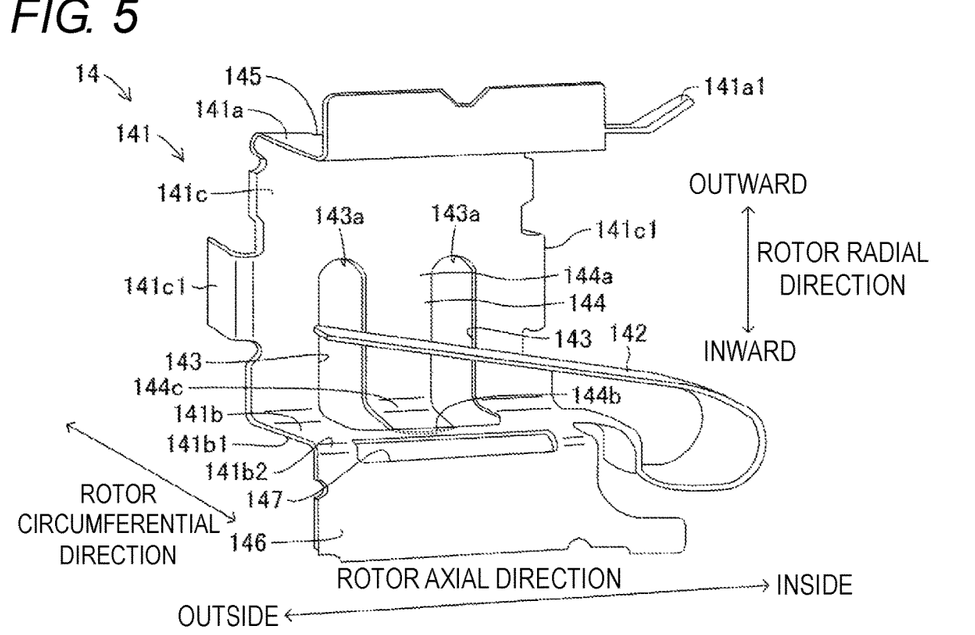
FIG. 5 is a front perspective view showing a configuration of the pad support spring of FIG. 3.
Figure 6:
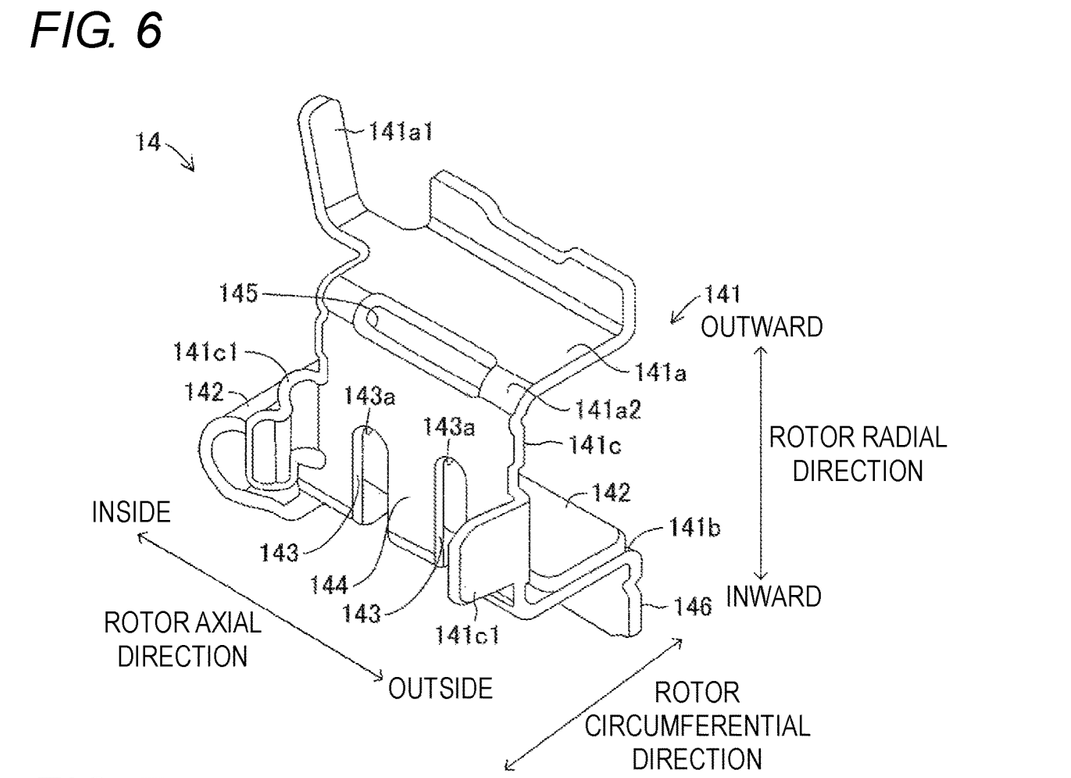
FIG. 6 is a rear perspective view showing a configuration of the pad support spring of FIG. 3.

As shown in FIGS. 4, 5, and 6, the pad support spring 14 includes a U-shaped portion 141. The U-shaped portion 141 includes an outer peripheral surface portion 141a, an inner peripheral surface portion 141b, and a linking surface portion 141c. The outer peripheral surface portion 141a abuts against the outward side inner peripheral surface 123a of the concave portion 123 in the assembled state to the concave portion 123 shown in FIG. 4. The inner peripheral surface portion 141b has a predetermined gap so that it is configured to abut against the inward side inner peripheral surface 123b of the concave portion 123 in the assembled state to the concave portion 123. The linking surface portion 141c links the outer peripheral surface portion 141a and the inner peripheral surface portion 141b and abuts against the connecting surface 123c of the concave portion 123 in the assembled state to the concave portion 123.

As shown in FIGS. 5 and 6, the outer peripheral surface portion 141a is provided with a pad guiding portion 141a1 for guiding the back plate 131 when the back plate 131 of the brake pad 13 is assembled to the U-shaped portion 141. As shown in FIGS. 5 and 6, the linking surface portion 141c is provided with a support holding portion 141c1 for elastically sandwiching the concave portion 123 in the rotor axial direction to prevent the pad support spring 14 from dropping out of the concave portion 123.

As shown in FIG. 5, the pad support spring 14 includes a pad holding portion 142 serving as a spring portion extending from the inner peripheral surface portion 141b so as to be inclined toward the outside with the inside as the center along the rotor axial direction at inside the U-shaped portion 141 and between the outer peripheral surface portion 141a and the inner peripheral surface portion 141b. The pad holding portion 142 separates the brake pad 13, that is, the back plate 131 and the lining 134 from the rotor main body 11a of the disk rotor 11 and elastically suppresses the movement of the brake pad 13 in the rotor radial direction when not being pushed by the pushing member 124. Note that the pad holding portion 142 shown in FIG. 6 is virtually in an elastically deformed state when holding the convex portion 132, and shows a state in which it is in contact with the inner peripheral surface portion 141b.

The pad support spring 14 includes a cutout portion 143, a tongue piece portion 144, and a first slit portion 145. The cutout portion 143 is continuous from the linking surface portion 141c toward the inner peripheral surface portion 141b, and is provided by cutting out a part of the linking surface portion 141c and the inner peripheral surface portion 141b. Here, as shown in FIG. 5, the cutout portion 143 is provided such that an end 143a on the linking surface portion 141c side is located outward in the rotor radial direction with respect to the pad holding portion 142 in a free state in which it is not elastically deformed before holding the convex portion 132.

The tongue piece portion 144 is formed by the cutout portion 143. The tongue piece portion 144 has a side of the end 143a of the cutout portion 143 as a base end 144a, and has the distal end 144b extending to the inner peripheral surface portion 141b. Here, as shown in FIG. 5, the tongue piece portion 144 includes a bent portion 144c between the base end 144a and the distal end 144b, where the distal end 144b is bent toward the inner peripheral surface portion 141b by the bent portion 144c and is separated from the linking surface portion 141c. The base end 144a of the tongue piece portion 144 is provided such that the end 143a on the linking surface portion 141c side is located outward in the rotor radial direction with respect to the pad holding portion 142 in a free state in which it is not elastically deformed.

Figure 7:
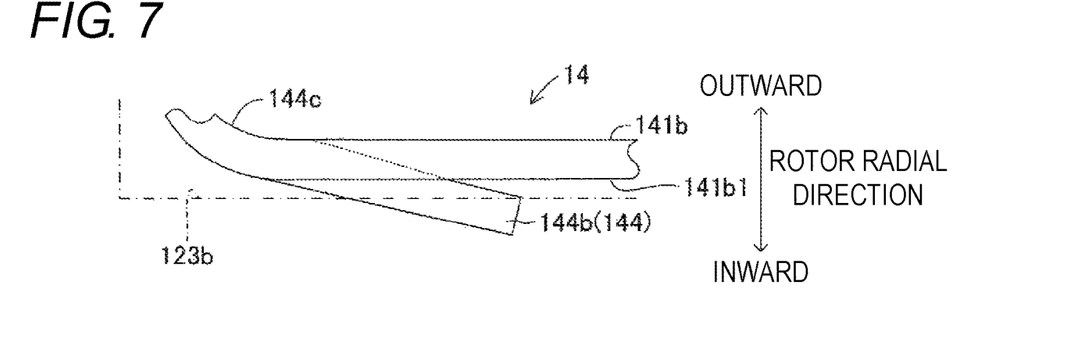
FIG. 7 is a view for describing a tongue piece portion of the pad support spring.

In an unassembled state (free state) in which the pad support spring 14 is not assembled to the concave portion 123, the distal end 144b of the tongue piece portion 144 is located more inward in the rotor radial direction than an opposing surface 141b1 that opposes the inward side inner peripheral surface 123b of the inner peripheral surface portion 141b, as shown in FIG. 7. That is, the distal end 144b of the tongue piece portion 144 is provided so as to project out from the opposing surface 141b1 of the inner peripheral surface portion 141b toward the inward side inner peripheral surface 123b in a free state.

As shown in FIGS. 5 and 7, the bent portion 144c is bent in a plane (direction of plane of drawing of FIG. 7) perpendicular to the opposing surface 141b1 of the inner peripheral surface portion 141b and including the base end 144a and the distal end 144b of the tongue piece portion 144 such that a portion projecting out from the opposing surface 141b1 of the tongue piece portion 144 toward the inward side inner peripheral surface 123b forms an angle with respect to the opposing surface 141b1. Thus, the length of the tongue piece portion 144 can be increased such that the base end 144a is on the linking surface portion 141c side and the distal end 144b is on the inner peripheral surface portion 141b side through the bent portion 144c.

As shown in FIG. 7, the projection amount of the distal end 144b of the tongue piece portion 144 that projects out from the opposing surface 141b1 in the free state is set so as to be larger than the gap between the inward side inner peripheral surface 123b of the concave portion 123 and the opposing surface 141b1 in the assembled state. As shown in FIG. 4, in the assembled state, the projection amount is set in accordance with a magnitude of an elastic force (so-called rigidity) generated when the tongue piece portion 144 elastically deforms and warps by coming into contact with the inward side inner peripheral surface 123b. Therefore, the elastic force (rigidity) of the tongue piece portion 144 can be adjusted by appropriately adjusting the projection amount, in other words, the length of the tongue piece portion 144.

Thus, in the assembled state in which the pad support spring 14 is assembled to the concave portion 123, the distal end 144b abuts against the inward side inner peripheral surface 123b to be curved and elastically deformed outward in the rotor radial direction. The elastic force generated by this elastic deformation presses the convex portion 132 of the back plate 131, that is, the brake pad 13 together with the U-shaped portion 141 outward in the rotor radial direction. As a result, when the tongue piece portion 144 is not pushed by the pushing member 124, the movement of the brake pad 13 in the rotor radial direction is elastically suppressed.

As shown in FIG. 6, the first slit portion 145 is provided by cutting out a part of a first linking part 141a2 bent to link the plate-shaped outer peripheral surface portion 141a and the plate-shaped linking surface portion 141c to each other along the first linking part 141a2, that is, in the width direction of the outer peripheral surface portion 141a and the linking surface portion 141c and along the rotor axial direction in the assembled state. When the pad support spring 14 is assembled to the concave portion 123, the first slit portion 145 reduces the elastic force (so-called rigidity) when the outer peripheral surface portion 141a elastically deforms toward the inner peripheral surface portion 141b around the first linking part 141a2. Thus, when the elastic force (rigidity) of the outer peripheral surface portion 141a is reduced, the bending deformation is prevented from occurring in the linking surface portion 141c linked through the first linking part 141a2 accompanying the elastic deformation of the outer peripheral surface portion 141a. Thus, distortion is prevented from occurring in the U-shaped portion 141, and as a result, an excessive gap, that is, floating is prevented from occurring between the inner peripheral surface portion 141b and the inward side inner peripheral surface 123b.

Furthermore, as shown in FIGS. 4 and 5, the pad support spring 14 of the present embodiment includes an abutment surface portion 146 and a second slit portion 147 provided on the U-shaped portion 141. The abutment surface portion 146 is linked to a side opposite to the linking surface portion 141c of the inner peripheral surface portion 141b, extended inward in the rotor radial direction, and brought into contact with the torque receiving surface 125 of the mount 121 in the assembled state. Thus, the abutment surface portion 146 is configured to abut against the torque transmitting surface 133 of the back plate 131 of the brake pad 13 that has moved in the rotor circumferential direction.

The second slit portion 147 is provided by cutting out a part of the second linking part 141b2 between the inner peripheral surface portion 141b and the abutment surface portion 146 along the second linking part 141b2, that is, along the width direction of the inner peripheral surface portion 141b and the linking surface portion 141c and in the rotor axial direction in the assembled state. When the abutment surface portion 146 abuts against the torque transmitting surface 133 of the back plate 131, the second slit portion 147 reduces the elastic force (so-called rigidity) when the abutment surface portion 146 elastically deforms toward the torque receiving surface 125 around the second linking part 141b2. Thus, when the elastic force (rigidity) of the abutment surface portion 146 is reduced, the bending deformation is prevented from occurring in the inner peripheral surface portion 141b linked through the second linking part 141b2 accompanying the elastic deformation of the abutment surface portion 146. This prevents an excessive gap, that is, floating from occurring between the inner peripheral surface portion 141b and the inward side inner peripheral surface 123b.

Figure 8:
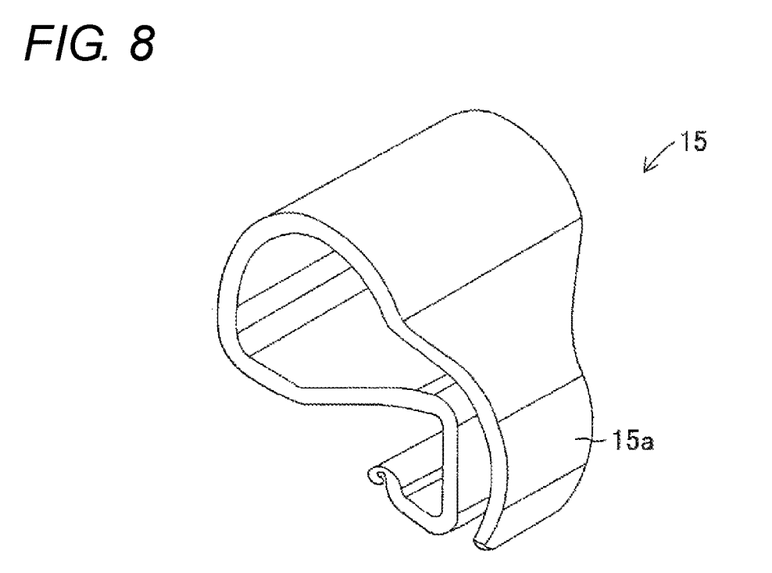
FIG. 8 is a perspective view showing a configuration of a pressing spring of FIG. 3.
Figure 9:
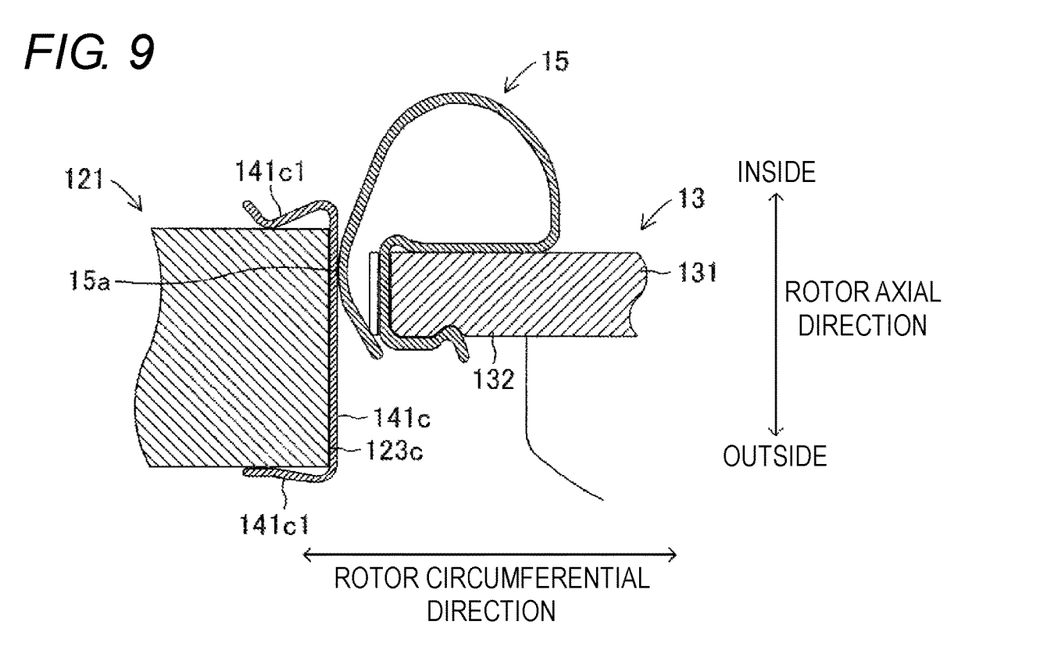
FIG. 9 is a cross-sectional view showing a contact state between the pad support spring and the pressing spring.

As shown in FIG. 4, a pressing spring 15 serving as a pressing member that is assembled to the convex portion 132 of the back plate 131 and that resiliently presses the back plate 131 along the rotor circumferential direction is attached to the brake pad 13. As shown in FIG. 8, the pressing spring 15 has a plurality of bending portions formed by bend-processing a plate-shaped metal band, and is formed into a substantially annular shape. As shown in FIGS. 4 and 9, in the assembled state, the pressing spring 15 has a bending portion 15a, that has entered the inside of the U-shaped portion 141 together with the convex portion 132, of the plurality of bending portions, brought into contact with the linking surface portion 141c of the pad support spring 14. Thus, when the brake pad 13 is pushed by the pushing member 124 and moved toward the rotor main body 11a, or when the brake pad 13 is biased by the pad holding portion 142 and moved in a direction away from the rotor main body 11a, the bending portion 15a comes into sliding contact with the linking surface portion 141c.

In the disk brake device 10 configured as described above, an assembling load when the pad support spring 14 is assembled to the concave portion 123 of the mount 121 is greatly reduced. As a result, in the assembled state, the pad support spring 14 stably supports the brake pad 13 without causing useless floating between the inner peripheral surface portion 141b and the inward side inner peripheral surface 123b, that is, without causing distortion in the U-shaped portion 141. Hereinafter, this will be specifically described.

Figure 10:
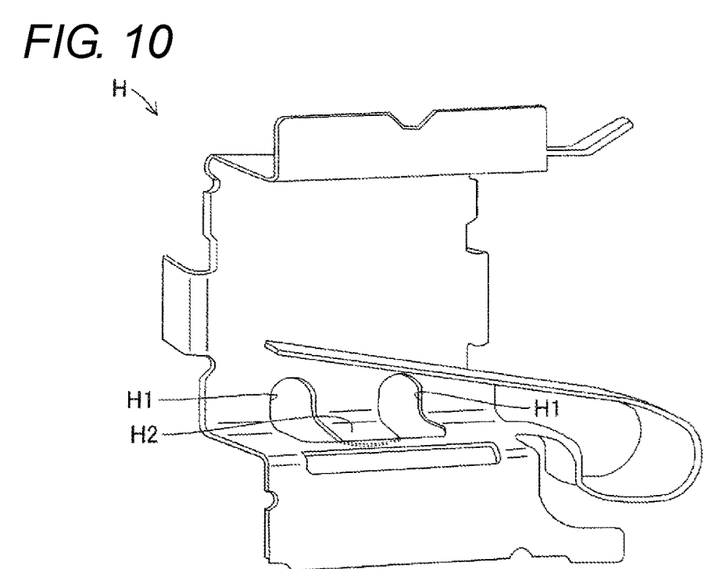
FIG. 10 is a perspective view showing a configuration of a comparative product of the pad support spring.

Here, in the following description, in order to facilitate the understanding, as shown in FIG. 10, a comparative product H that includes a cutout portion H1 and a tongue piece portion H2 which are shorter than the cutout portion 143 and the tongue piece portion 144 of the pad support spring 14, and that does not include the first slit portion 145 is assumed. The comparative product H is configured in the same manner as the pad support spring 14 except that the comparative product H includes the cutout portion H1 and the tongue piece portion H2 different from those of the pad support spring 14 and that the first slit portion 145 is omitted.

When the pad support spring 14 and the comparative product H are assembled to the concave portion 123 of the mount 121, the pad support spring 14 and the comparative product H are inserted from the linking surface portion 141c side toward the connecting surface 123c of the concave portion 123. Then, with increase in the stroke accompanying the insertion, the tongue piece portion 144 and the tongue piece portion H2 abut against the inward side inner peripheral surface 123b of the concave portion 123, and the tongue piece portion 144 and the tongue piece portion H2 generate an elastic force by elastic deformation. Here, the elastic force increases with an increase in the amount of elastic deformation of the tongue piece portion 144 and the tongue piece portion H2 in accordance with the stroke, that is, with an increase in the warping amount, and thus increases with an increase in the stroke.

On the other hand, as the stroke is further increased while the tongue piece portion 144 and the tongue piece portion H2 generate an elastic force, the outer peripheral surface portion 141a elastically deforms toward the inner peripheral surface portion 141b by the abutment against the outward side inner peripheral surface 123a and generates an elastic force. When the stroke is further increased, the linking surface portion 141c abuts against the connecting surface 123c, and the assembly of the pad support spring 14 and the comparative product H is completed.

Figure 11:
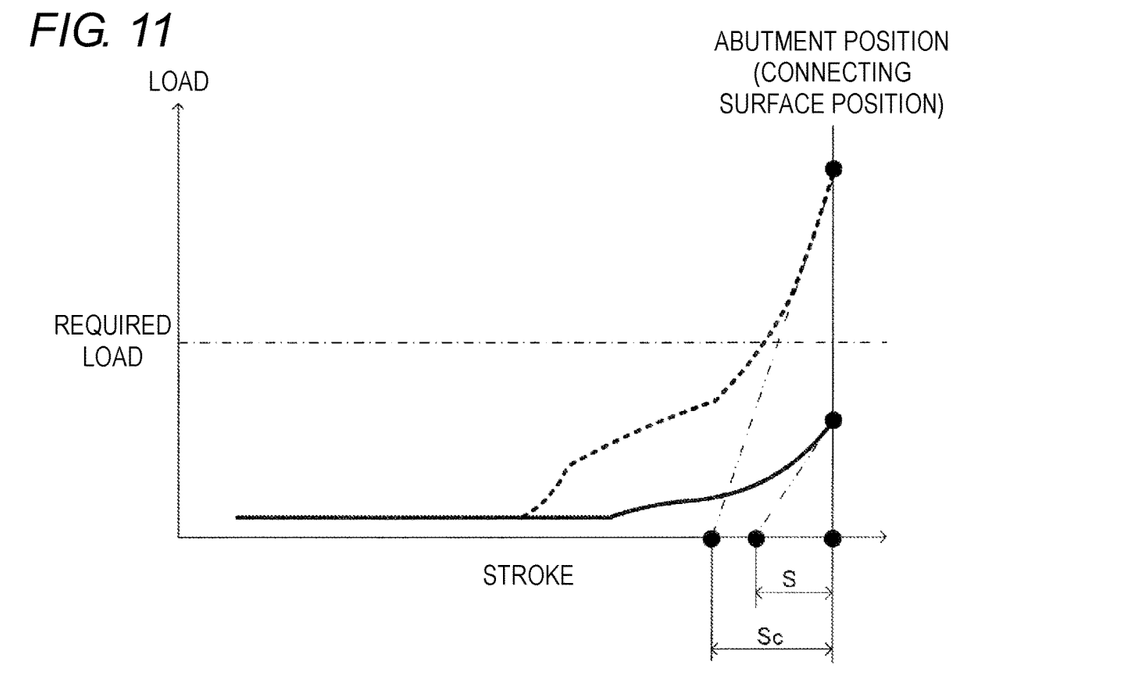
FIG. 11 is a view showing a load in assembling of the pad support spring and the comparative product.

The load in assembling the pad support spring 14 and the comparative product H is different as shown in FIG. 11. More specifically, in the pad support spring 14 shown by a solid line in FIG. 11, even when elastic deformation of the tongue piece portion 144 and elastic deformation of the outer peripheral surface portion 141a occur, the load falls below the required load required for assembly. On the other hand, in the comparative product H shown by a broken line in FIG. 11, the load starts to increase sharply due to the elastic deformation of the tongue piece portion H2, and the elastic force exceeds the required load due to the large elastic deformation in the outer peripheral surface portion 141a accompanying the increase in the stroke.

Such a difference in load results from a difference in length between the tongue piece portion 144 and the tongue piece portion H2. As described above, the tongue piece portion 144 of the pad support spring 14 includes the base end 144a on the side closer to the outer peripheral surface portion 141a than the pad holding portion 142, as shown in FIG. 5. On the other hand, the tongue piece portion H2 of the comparative product H includes a base end on the side closer to the inner peripheral surface portion 141b than the pad holding portion 142, as shown in FIG. 10. In this case, the distance between the base end 144a (supporting point) supporting the tongue piece portion 144 and the distal end 144b (force point) to which a force is input by contact with the inward side inner peripheral surface 123b accompanying the assembly is longer than the distance of the tongue piece portion H2. Thus, the tongue piece portion 144 more easily warps than the tongue piece portion H2, and as a result, increase in the elastic force with respect to the stroke can be suppressed. As a result, the force at which the tongue piece portion 144 presses the U-shaped portion 141 outward in the rotor radial direction is smaller than the force at which the tongue piece portion H2 presses the U-shaped portion 141 outward in the rotor radial direction.

In addition to the difference in the force of pressing at which the tongue piece portion 144 and the tongue piece portion H2 press outward in the rotor radial direction, since the pad support spring 14 includes the first slit portion 145, the elastic force generated by the outer peripheral surface portion 141a of the pad support spring 14 becomes smaller than the elastic force generated by the outer peripheral surface portion 141a of the comparative product H. Therefore, the pad support spring 14 can greatly reduce the load in assembly from the required load.

If the load in assembling the pad support spring 14 into the concave portion 123 is small, this means that the deformation that occurs in the outer peripheral surface portion 141a, the inner peripheral surface portion 141b and the linking surface portion 141c forming the U-shaped portion 141 is small, that is, the distortion generated in the U-shaped portion 141 is reduced. Thus, as shown in FIG. 11, the floating amount S of the floating which is the gap between the linking surface portion 141c and the connecting surface 123c is small as compared with the floating amount Sc of the comparative product H in which the distortion generated in the U-shaped portion 141 is large. In other words, in the pad support spring 14, the linking surface portion 141c is in closer contact with the connecting surface 123c as compared with the comparative product H. Since the linking surface portion 141c is supported in close contact with the connecting surface 123c, the deformation of the inner peripheral surface portion 141b linked to the linking surface portion 141c and the abutment surface portion 146 linked to the inner peripheral surface portion 141*b* is not promoted. Therefore, distortion of the pad support spring 14 is suppressed in the assembled state to the concave portion 123, the gap between the inner peripheral surface portion 141*b* and the inward side inner peripheral surface 123*b* is appropriately maintained, and the contact between the abutment surface portion 146 and the torque receiving surface 125 is maintained.

The second linking part 141*b*2 is provided with the second slit portion 147. Thus, for example, when a small gap is generated between the abutment surface portion 146 and the torque receiving surface 125, even if the torque transmitting surface 133 of the back plate 131 presses the abutment surface portion 146, the elastic deformation of the abutment surface portion 146 is prevented from affecting the inner peripheral surface portion 141*b*. Therefore, a gap between the inner peripheral surface portion 141*b* and the inward side inner peripheral surface 123*b* is appropriately maintained.

As can be understood from the above description, the disk brake device 10 of the present embodiment is configured to include a disk rotor 11 having a rotor main body 11*a* rotatable integrally with wheels, a caliper 12 having a mount 121 serving as a supporting body assembled to a vehicle body, a pair of brake pads 13 that includes a back plate 131 supported by the mount 121 so as to be movable along the rotor axial direction of the disk rotor 11 and a lining 134 fixed to the back plate, and that sandwiches the rotor main body 11*a* of the disk rotor 11, a pushing member 124 that is assembled to the mount 121 and that pushes the back plate 131 toward the rotor main body 11*a* of the disk rotor 11, a convex portion 132 that is formed on a circumferential end 131*a* of the back plate 131 in the rotor circumferential direction of the disk rotor 11 and that projects out from the circumferential end 131*a*, a concave portion 123 that is formed on the mount 121 and that accommodates the convex portion so as to be movable in the rotor axial direction of the disk rotor 11, the rotor radial direction and the rotor circumferential direction of the disk rotor 11, and a pad support spring 14 serving as an elastic member that is interposed between the convex portion 132 and the concave portion 123 in an assembled state of being assembled to the concave portion 123 and that holds the back plate 131 while biasing, where the pad support spring 14 includes, in the assembled state, a U-shaped portion 141 having an outer peripheral surface portion 141*a* that abuts against an outward side inner peripheral surface 123*a* of the concave portion 123 to be the outward side in the rotor radial direction, an inner peripheral surface portion 141*b* that is configured to abut against an inward side inner peripheral surface 123*b* of the concave portion 123 to be the inward side in the rotor radial direction, and a linking surface portion 141*c* that links the outer peripheral surface portion 141*a* and the inner peripheral surface portion 141*b* and that abuts against a connecting surface 123*c* connecting the outward side inner peripheral surface 123*a* and the inward side inner peripheral surface 123*b*, a pad holding portion 142 serving as a spring portion that extends from the inner peripheral surface portion 141*b* so as to incline along the rotor axial direction between the outer peripheral surface portion 141*a* and the inner peripheral surface portion 141*b* and that separates the back plate 131 away from the rotor main body 11*a* of the disk rotor 11, a cutout portion 143 provided by cutting out a part of the linking surface portion 141*c* and the inner peripheral surface portion 141*b* in continuation from the linking surface portion 141*c* toward the inner peripheral surface portion 141*b*, in the unassembled state of not being assembled to the concave portion 123, a tongue piece portion 144 that is formed in the cutout portion 143, that has a base end 144*a* provided on the side closer to the outer peripheral surface portion 141*a* than the pad holding portion 142 in the rotor radial direction and which distal end 144*b* projects out toward the inward side inner peripheral surface 123*b* from the opposing surface 141*b*1 opposing the inward side inner peripheral surface 123*b* of the inner peripheral surface portion 141*b*, and that elastically deforms in the rotor radial direction to press the brake pad 13 outward together with the U-shaped portion 141 in the assembled state, and a first slit portion 145 provided by cutting out a part of a first linking part 141*a*2 linking the outer peripheral surface portion 141*a* and the linking surface portion 141*c* along the first linking part 141*a*2.

According to this, the tongue piece portion 144 forming the pad support spring 14 can be extended from the linking surface portion 141*c* toward the inner peripheral surface portion 141*b* of the U-shaped portion 141, and hence the length of the tongue piece portion 144 can be easily adjusted, and the elastic force generated by the elastic deformation of the tongue piece portion 144 in the assembled state in which the pad support spring 14 is assembled in the concave portion 123 can be easily adjusted. Furthermore, since the first slit portion 145 can be provided at the first linking part 141*a*2 between the outer peripheral surface portion 141*a* and the linking surface portion 141*c*, in the assembled state, the elastic force when the outer peripheral surface portion 141*a* is elastically deformed toward the inner peripheral surface portion 141*b* to warp can be reduced.

Thus, in the assembled state, occurrence of floating in which the inner peripheral surface portion 141*b* is separated more than necessary from the inward side inner peripheral surface 123*b* of the concave portion 123 by the elastic force of the tongue piece portion 144 can be suppressed, and it is suppressed that the floating of the inner peripheral surface portion 141*b* is promoted by the elastic force of the outer peripheral surface portion 141*a*. Therefore, distortion of the U-shaped portion 141 of the pad support spring 14 can be suppressed. Therefore, the pad support spring 14 can stably support the brake pad 13. Furthermore, since the occurrence of the distortion of the U-shaped portion 141, in particular, the distortion of the linking surface portion 141*c* can be suppressed, increase in the sliding resistance can be suppressed and smooth movement of the brake pad 13 can be maintained even in a case in which the pressing spring 15 which is a member that comes into sliding contact with the linking surface portion 141*c* with the movement of the brake pad 13 is provided.

In particular, in the disk brake device 10, a braking force (braking torque) is transmitted from the brake pad 13 to the inward side inner peripheral surface 123*b* of the concave portion 123 and the torque receiving surface 125. In this case, if an excessive gap, that is, floating occurs between the inner peripheral surface portion 141*b* and the inward side inner peripheral surface 123*b*, the inner peripheral surface portion 141*b* easily vibrates at the time of gentle braking, and as a result, abnormal noise (so-called brake squeal) easily occurs. On the other hand, the pad support spring 14 has a small distortion in an assembled state, and hence even if the transmitted braking force (braking torque) is small, it can appropriately make contact with the inward side inner peripheral surface 123*b* of the concave portion 123 with the floating of the inner peripheral surface portion 141*b* reduced. Therefore, the generation of brake squeal caused by the vibration of the pad support spring 14 can be effectively suppressed at the time of gentle braking.

In this case, the tongue piece portion 144 has the bent portion 144c bent toward the inner peripheral surface portion 141b between the base end 144a and the distal end 144b so that the distal end 144b is separated from the linking surface portion 141c, where the bent portion 144c is bent in a plane perpendicular to the opposing surface 141b1 and including the base end 144a and the distal end 144b of the tongue piece portion 144 so that a portion projecting out from the opposing surface 141b1 of the tongue piece portion 144 forms an angle with respect to the opposing surface 141b1.

Thus, the length of the tongue piece portion 144 can be ensured sufficiently long. Thus, the length of the tongue piece portion 144 can be easily adjusted, and the influence of the variation in the length of the tongue piece portion 144 can be eliminated and the elastic force generated by the elastic deformation of the tongue piece portion 144 in the assembled state can be appropriately adjusted. Therefore, in the assembled state, the distortion of the U-shaped portion 141 of the pad support spring 14 can be suppressed, and the occurrence of floating with respect to the inward side inner peripheral surface 123b of the inner peripheral surface portion 141b can be suppressed. Therefore, the pad support spring 14 can stably support the brake pad 13.

In these cases, the pad support spring 14 includes the abutment surface portion 146 that is configured to abut against the torque transmitting surface 133 of the back plate 131 that has moved in the rotor circumferential direction, linked to a side opposite to the linking surface portion 141c of the inner peripheral surface portion 141b, and extended toward the inward side in the rotor radial direction, and a second slit portion 147 provided by cutting out a part of the second linking part 141b2 between the inner peripheral surface portion 141b and the abutment surface portion 146 along the second linking part 141b2.

Therefore, since the second slit portion 147 can be provided at the second linking part 141b2 between the inner peripheral surface portion 141b and the abutment surface portion 146, when the torque transmitting surface 133 of the back plate 131 abuts against the abutment surface portion 146 in the assembled state and is elastically deformed toward the inner peripheral surface portion 141b to warp, the elastic force can be reduced. When a gap (floating) occurs between the abutment surface portion 146 and the torque receiving surface 125, the abutment surface portion 146 easily vibrates at the time of gentle braking, and as a result, abnormal noise (so-called brake squeal) easily occurs. On the other hand, the abutment surface portion 146 is easily elastically deformed even when the braking force (braking torque) is small, and can be appropriately brought into contact with the torque receiving surface 125 with a small floating, so that the generation of brake squeal caused by the vibration of the abutment surface portion 146 can be effectively suppressed at the time of gentle braking.

<Modified Example>

In the embodiment described above, the bending portion 15a of the pressing spring 15 that enters the inside of the U-shaped portion 141 of the pad support spring 14 is brought into sliding contact with the planar linking surface portion 141c. In this case, in the pad support spring 14, since the deformation of the linking surface portion 141c is suppressed, the pressing spring 15 can move smoothly while sliding on the linking surface portion 141c.

The bending portion 15a of the pressing spring 15 has a work hardening involved in the bending process, whereas the linking surface portion 141c is a planar (flat plate shape) and has no work hardening. Thus, when the bending portion 15a of the work-hardened pressing spring 15 repeatedly slides with the relatively soft linking surface portion 141c, for example, the surface of the linking surface portion 141c is worn by the bending portion 15a, and as a result, catch may occur in the brake pad 13 and the sliding resistance of the brake pad 13 that moves forward and backward in the rotor axial direction may increase.

Figure 12:
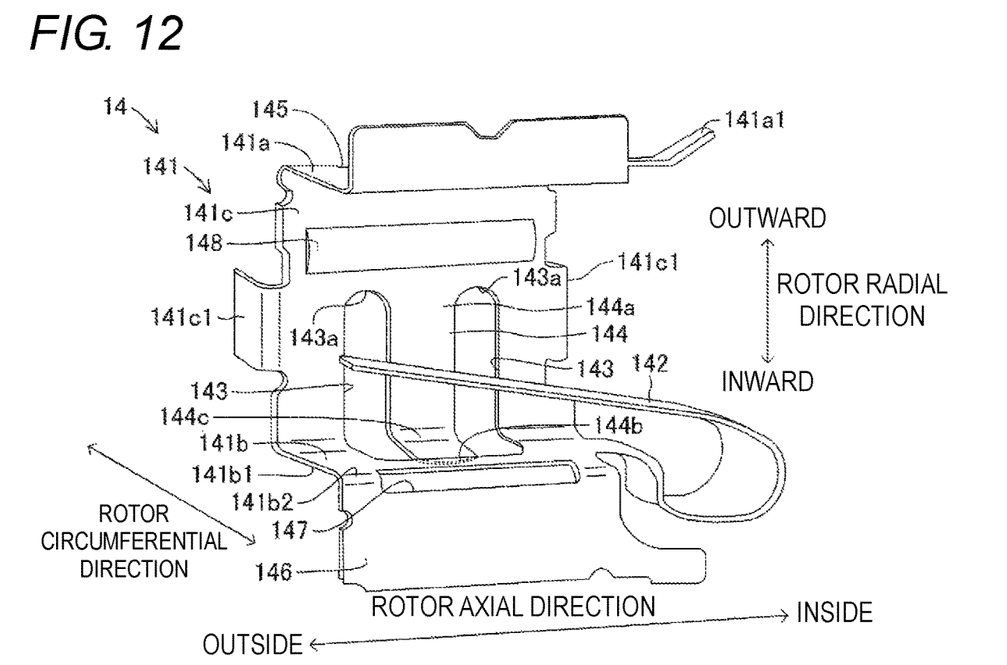
FIG. 12 is a front perspective view showing a configuration of a pad support spring according to a modified example of the embodiment.
Figure 13:
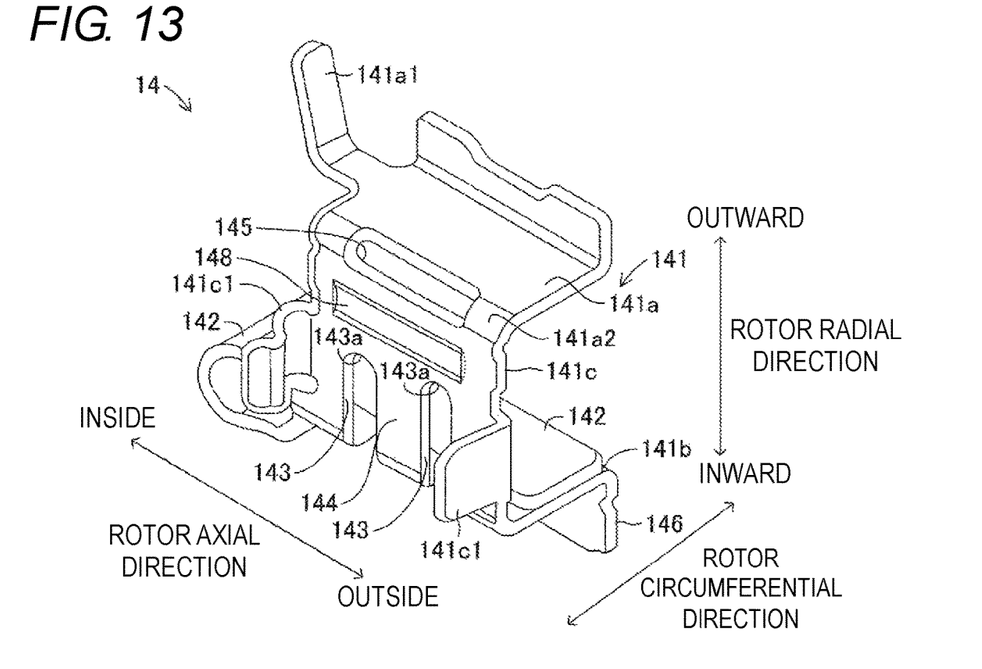
FIG. 13 is a rear perspective view showing the configuration of the pad support spring according to the modified example of the embodiment.
Figure 14:
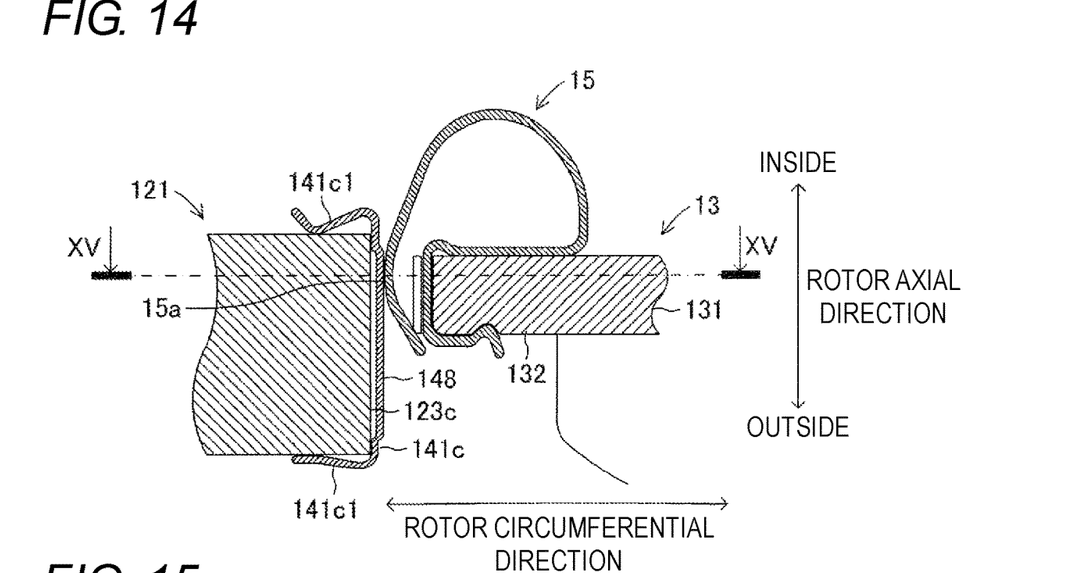
FIG. 14 is a cross-sectional view showing a contact state between the pad support spring and the pressing spring according to the modified example of the embodiment.

Therefore, in this modified example, as shown in FIGS. 12 and 13, a projecting ridge 148 having work hardening is provided on the linking surface portion 141c of the pad support spring 14, and as shown in FIG. 14, the projecting ridge 148 and the bending portion 15a of the pressing spring 15 are slidably moved.

The projecting ridge 148 is provided so as to come into contact with the bending portion 15a that has entered the inside of the U-shaped portion 141 together with the convex portion 132 of the back plate 131, of the plurality of bending portions of the pressing spring 15 in the assembled state. The projecting ridge 148 is provided such that the distal end side facing the bending portion 15a of the pressing spring 15 has an arc-shaped (arc-shaped distal end) cross-section. The projecting ridge 148 is provided along the rotor axial direction between the first linking part 141a2 and the cutout portion 143 (more specifically, the end 143a on the outer peripheral surface portion 141a side of the cutout portion 143).

Therefore, in the modified example, there is provided the pressing spring 15 serving as a pressing member that includes the bending portion 15a, is assembled to the convex portion 132 and that resiliently presses the back plate 131 along the rotor circumferential direction, where in the assembled state, the pad support spring 14 includes the projecting ridge 148 that has an arc-shaped distal end, that projects out toward the inside of the U-shaped portion 141 at the linking surface portion 141c, and that extends along the rotor axial direction so as to come into contact with the bending portion 15a that has entered the inside of the U-shaped portion 141 together with the convex portion 132, of the bending portions of the pressing spring 15. In this case, the projecting ridge 148 is provided between the first linking part 141a2 and the cutout portion 143.

Figure 15:
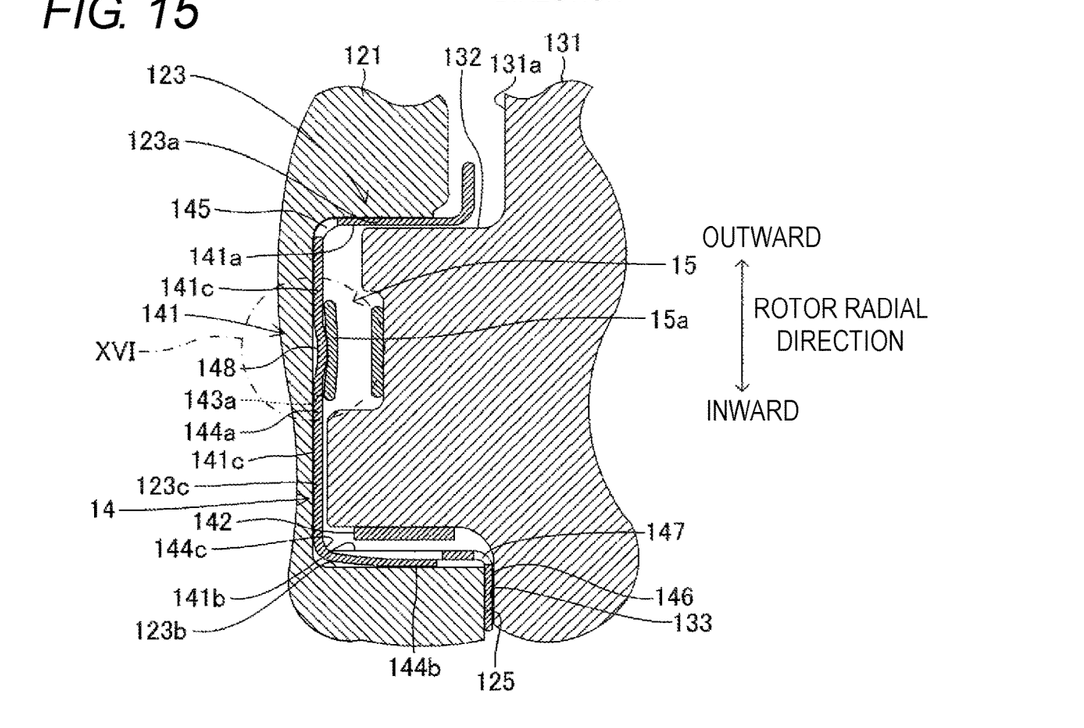
FIG. 15 is a cross-sectional view showing a cross-section taken along line XV-XV of FIG. 14.
Figure 16:
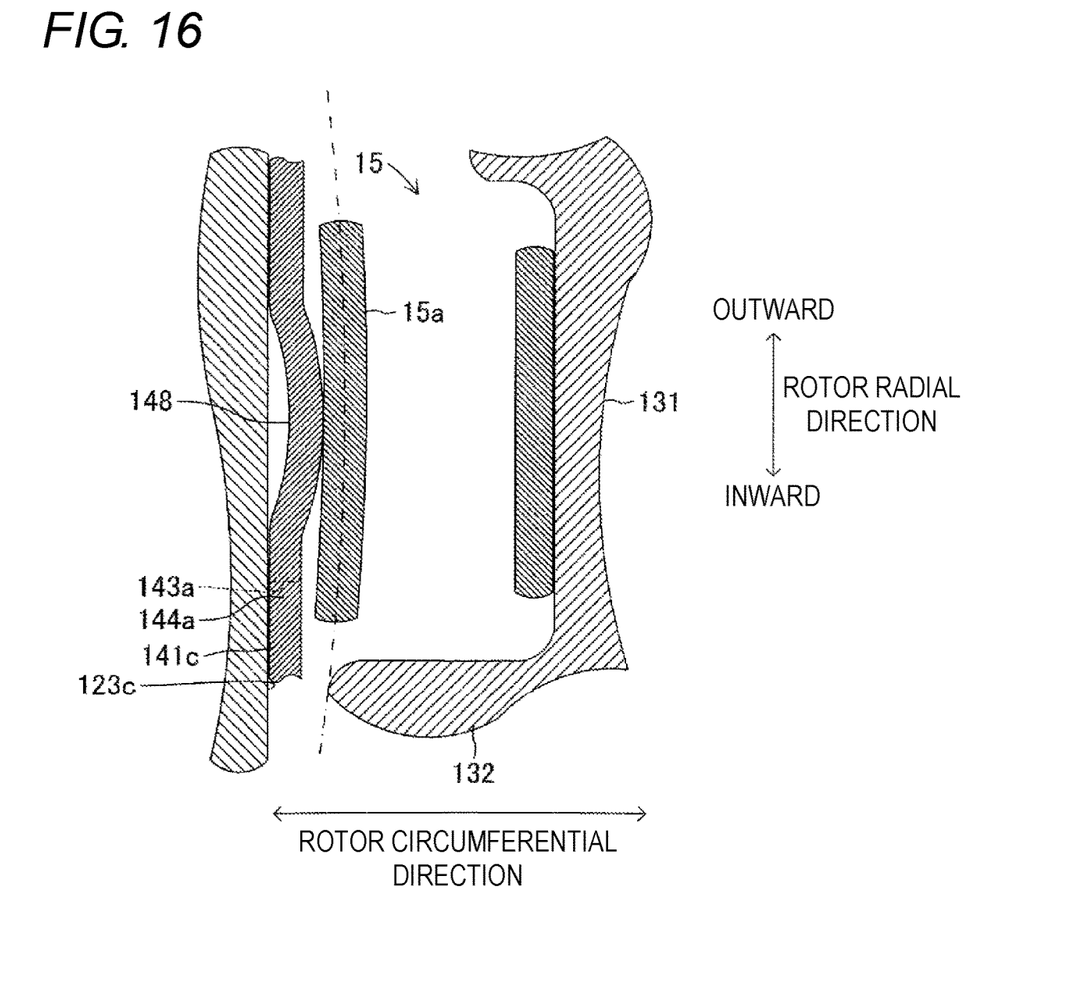
FIG. 16 is a cross-section view in which an XVI portion of FIG. 15 is enlarged.

Thus, when the pressing spring 15 moves together with the brake pad 13, the work-hardened projecting ridge 148 and the work-hardened bending portion 15a come into sliding contact with each other, so that the occurrence of wear involved in sliding can be suppressed. Furthermore, when the projecting ridge 148 and the bending portion 15a are in sliding contact with each other, as shown in FIGS. 15 and 16, the bending portion 15a of the pressing spring 15 pressed by the projecting ridge 148 is elastically deformed to have a curved surface along the shape of the projecting ridge 148. Therefore, at the contact portion, the arc (curved surface) of the projecting ridge 148 and the curved surface of the bending portion 15a are brought into contact with each other, so that the pressing spring 15, that is, the brake pad 13 with respect to the pad support spring 14 can be appropriately positioned in the rotor radial direction, and the brake pad 13 can be stably supported.

As a result, when the brake pad 13 is moved toward the rotor main body 11a by the pushing member 124, and when the brake pad 13 is moved to separate from the rotor main body 11a by the pad holding portion 142, the brake pad 13 can be more smoothly moved along the rotor axial direction. Therefore, since the pad holding portion 142 can smoothly move the brake pad 13, the brake pad 13 can be appropriately separated from the rotor main body 11a, and as a result, in particular, the generation of brake squeal at the time of gentle braking can be suppressed. Other effects are the same as in the embodiment described above.

The implementation of the present invention is not limited to the above embodiment and the above modified example, and various modifications can be made without departing from the purpose of the present invention.

For example, in the embodiment and the modified example described above, for the inner pad 13 and the outer pad 13, the pad support spring 14 is provided on each of the convex portions 132 provided on both circumferential ends 131a of the back plate 131, that is, the four pad support springs 14 are separately provided. Instead, the pad support spring serving as an elastic member in which the inner side and the outer side are integrally structured may be adopted so as to be assembled to one circumferential end 131a of the inner pad 13 and the outer pad 13 and assembled to the other circumferential end 131a of the inner pad 13 and the outer pad 13.

Furthermore, in the embodiment and the modified example described above, since the torque receiving surface 125 of the mount 121 and the torque transmitting surface 133 of the brake pad 13 are provided on the inward side in the rotor radial direction, the abutment surface portion 146 is linked to the inner peripheral surface portion 141b through the second linking part 141b2. Instead, when the torque receiving surface 125 of the mount 121 and the torque transmitting surface 133 of the brake pad 13 are provided on the outward side in the rotor radial direction, the abutment surface portion may be linked to the outer peripheral surface portion. In this case, the cutout portion and the tongue piece portion can be formed from the linking surface portion toward the outer peripheral surface portion, the first slit portion can be formed at the linking part between the inner peripheral surface portion and the linking surface portion, and furthermore, the second slit portion can be provided at the linking part between the outer peripheral surface portion and the abutment surface portion.

The invention claimed is:

1. A disk brake device comprising:
   a disk rotor rotatable integrally with a wheel;
   a supporting body assembled to a vehicle body;
   a pair of brake pads that includes a back plate supported by the supporting body so as to be movable along an axial direction of the disk rotor and a lining fixed to the back plate, and that sandwiches the disk rotor;
   a pushing member that is assembled to the supporting body and that pushes the back plate toward the disk rotor;
   a convex portion that is formed on a circumferential end of the back plate in a circumferential direction of the disk rotor and that projects out from the circumferential end;
   a pressing member that includes bending portions and that is assembled to the convex portion to resiliently press the back plate along the circumferential direction,
   a concave portion that is formed on the supporting body and that accommodates the convex portion so as to be movable in the axial direction of the disk rotor, a radial direction and the circumferential direction of the disk rotor; and
   an elastic member that is interposed between the convex portion and the concave portion in an assembled state of being assembled to the concave portion and that holds the back plate while biasing, wherein the elastic member is configured to include,
   in the assembled state, a U-shaped portion having an outer peripheral surface portion that abuts against an outward side inner peripheral surface of the concave portion to be the outward side in the radial direction, an inner peripheral surface portion that is configured to abut against an inward side inner peripheral surface of the concave portion to be an inward side in the radial direction, and a linking surface portion that links the outer peripheral surface portion and the inner peripheral surface portion and that abuts against a connecting surface connecting the outward side inner peripheral surface and the inward side inner peripheral surface,
   a spring portion that extends from the inner peripheral surface portion so as to incline along the axial direction between the outer peripheral surface portion and the inner peripheral surface portion and that separates the back plate away from the disk rotor,
   a cutout portion provided by cutting out a part of the linking surface portion and the inner peripheral surface portion in continuation from the linking surface portion toward the inner peripheral surface portion,
   a projecting ridge that has an arc-shaped distal end, that projects out toward the inside at the linking surface portion, and that extends along the axial direction to make contact with the bending portion that has entered the inside of the U-shaped portion together with the convex portion, of the bending portions of the pressing member,
   in an unassembled state of not being assembled to the concave portion, a tongue piece portion that is formed in the cutout portion, that has a base end provided on the side closer to the outer peripheral surface portion than the spring portion in the radial direction and which distal end projects out toward the inward side inner peripheral surface from an opposing surface opposing the inward side inner peripheral surface of the inner peripheral surface portion, and that elastically deforms in the radial direction to press the brake pad outward together with the U-shaped portion in the assembled state, and
   a first slit portion provided by cutting out a part of a first linking part linking the outer peripheral surface portion and the linking surface portion.

2. The disk brake device according to claim 1, wherein the tongue piece portion includes a bent portion bent toward the inner peripheral surface portion between the base end and the distal end so that the distal end is separated from the linking surface portion, and a portion projecting out from the opposing surface of the tongue piece portion toward the inward side inner peripheral surface bends in a plane perpendicular to the opposing surface and including the base end and the distal end of the tongue piece portion to form an angle with respect to the opposing surface.

3. The disk brake device according to claim 1, wherein the elastic member includes,
   an abutment surface portion that is configured to abut against the back plate that has moved in the circumferential direction, and that is linked to a side opposite to the linking surface portion of the inner peripheral surface portion and extended toward the inward side in the radial direction, and
   a second slit portion provided by cutting out a part of a second linking part between the inner peripheral surface portion and the abutment surface portion along the second linking part.

4. The disk brake device according to claim 2, wherein the elastic member includes, an abutment surface portion that is configured to abut against the back plate that has moved in the circumferential direction, and that is linked to a side opposite to the linking surface portion of the inner peripheral surface portion and extended toward the inward side in the radial direction, and a second slit portion provided by cutting out a part of a second linking part between the inner peripheral surface portion and the abutment surface portion along the second linking part.

5. The disk brake device according to claim 1, wherein the projecting ridge is provided between the first linking part and the cutout portion.

6. The disk brake device according to claim 2, wherein the projecting ridge is provided between the first linking part and the cutout portion.

7. The disk brake device according to claim 3, wherein the projecting ridge is provided between the first linking part and the cutout portion.

8. The disk brake device according to claim 4, wherein the projecting ridge is provided between the first linking part and the cutout portion.

* * * * *